UNITED STATES PATENT OFFICE.

DAVID SANDMANN, OF BERLIN, GERMANY.

RUBBER.

935,414. Specification of Letters Patent. Patented Sept. 28, 1909.

No Drawing. Application filed December 28, 1908. Serial No. 469,592.

*To all whom it may concern:*

Be it known that I, DAVID SANDMANN, a subject of the German Emperor, residing at Berlin, in the Empire of Germany, have invented certain new and useful Improvements in Rubber; and I do hereby declare the following to be a full, clear, and exact description of the invention, such as will enable others skilled in the art to which it appertains to make and use the same.

My invention relates to improvements in rubber.

I have discovered that a number of lactescent plant juices contain substances that can be coagulated, such as the plant juices from which rubber, gutta-percha, balata, and the like, can be obtained. Hitherto in the extraction of these substances difficulty has been experienced in bringing about a quick and complete separation of the rubber, gutta-percha, or like substances from the milky juice. The usual method of drying and smoking the same in a thin layer is difficult and tedious, requiring weeks and sometimes months before the rubber is ready for shipment. I have found that an excellent article can be produced by coagulating the milky juice very quickly, and I have found that certain acids and salts are very effective for this purpose, namely, acids and salts containing fluorin. Hydro-fluoric acid and acid fluorin compounds render it possible to quickly separate the rubber, etc. from the juice or sap. At the temperatures which obtain in the countries where rubber, gutta-percha and balata are extracted, the addition of fluorin-containing substances brings about a pure fermentation of the sugar or similar substances contained in the sap, so that these substances are converted and may be removed, while the rubber substance remains unaffected and is protected against decomposition.

In carrying out the process of making rubber and similar articles, the juice is mixed with a very dilute solution of hydrofluoric acid about ¼ per cent., and the mixture thoroughly stirred. After standing for some hours, the rubber separates on the surface in a layer, while the fermented substances remain in solution in the liquid. This layer of rubber may be easily removed from the liquid. The rubber is then placed in a press and the mixture contained therein squeezed out (although before this is done the rubber may be washed, if desired). The rubber is then ready for shipment. Instead of hydrofluoric acid, almost any fluorin compound can be used, as, for example, silico-fluoric acid. 5 cubic centimeters of a 10 per cent. solution of silico-fluoric acid are added to a liter of crude sap, producing the separation referred to above. Similarly, potassium fluorid, or sodium fluorid, or acid salts thereof, or silicic fluoric acid salts, as for example, silicic fluorid of sodium, potassium or zinc can be used. These salts can be added to the sap in solid form and dissolved therein, or they can be used in solution.

Only a very small quantity of fluorin-containing substance is necessary to produce coagulation. Moreover by this process it is possible to obtain rubber as an inodorous dry and elastic product ready for shipment, in a considerably shorter time than has hitherto been the case. Decomposition of the pectin and sugar-containing substances which are present in the sap is avoided. The removal of the water from the rubber by pressure can be effected in a few minutes, so that the finished product can be obtained in a single day, whereas by other processes of drying in the air or under heat, several weeks or even months were necessary. The product obtained is of excellent quality, far superior to that obtained by former methods, being not contaminated with smoke or other substances and having the matters foreign to the rubber almost completely removed. It is probable that the alcohol produced by the fermentation of the sugar aids in the coagulation of the rubber, and this fermentation in turn is greatly facilitated by the addition of a fluorin-containing substance.

The rubber thus obtained is very nearly pure. It is not discolored and is very salable. Its odor too is superior to that of ordinary rubber, there being an entire absence of putrefied substances and only a very small loss in the washing processes. One of the most remarkable properties of this product is that it vulcanizes very much more rapidly than ordinary commercial rubber, and that when it is treated with sulfur and litharge, as in the process of producing hard rubber, no part of the litharge is changed into sulfid of lead, as is sure to happen under ordinary conditions. The affinity of the rubber to the sulfur, in other words, exceeds the affinity of the sulfur for the lead oxid, and it is thus possible to make hard rubber by the use of sulfur and litharge, which product does not contain any appreciable amount of sulfid of lead. The reason for this extraordinary affinity of the rubber for sulfur is difficult to state, although the fact is well known. It is probably due to the fact that the rubber produced is very quickly coagulated and separated from all the other substances contained in the sap, making a product which has a high affinity for sulfur and which when treated with sulfur is less liable to the attacks of oxygen. That is to say, owing to the quick fermentation, the rubber is quickly separated without separating therefrom the resins, but separating therefrom other foreign substances, such as pectin, sugar, etc., which are liable to decomposition, and leaving the resins in an acid condition in which they possess a strong affinity for sulfur.

The presence of the small quantities of fluoric acid or other fluorin compounds has a conserving quality on the rubber, and affords means to distinguish the new rubber from all the rubbers on market till now.

I claim:—

As a new article of manufacture, a hard rubber produced by coagulating the sap by a fluorin-containing substance, said coagulated product being pressed and vulcanized under heat with a mixture of sulfur and litharge, the product being elastic, inodorous and containing no appreciable quantity of sulfid of lead, substantially as described.

In testimony whereof, I affix my signature, in presence of two witnesses.

DAVID SANDMANN.

Witnesses:
 HENRY HASPER,
 WOLDEMAR HAUPT.